United States Patent
Sharma et al.

(10) Patent No.: US 12,351,317 B2
(45) Date of Patent: Jul. 8, 2025

(54) ROW OF PASSENGER SEATS CONVERTIBLE TO A BED

(71) Applicant: B/E Aerospace, Inc., Winston-Salem, NC (US)

(72) Inventors: Aditya Sharma, Bangalore (IN); Krishna Chaitanya Prathipati, Hyderabad (IN); Ravindra Ramulu Kandukuri, Secunderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 18/379,531

(22) Filed: Oct. 12, 2023

(65) Prior Publication Data
US 2025/0051014 A1  Feb. 13, 2025

(30) Foreign Application Priority Data
Aug. 8, 2023 (IN) .............................. 202341053129

(51) Int. Cl.
*B64D 11/06* (2006.01)

(52) U.S. Cl.
CPC ................................ *B64D 11/0641* (2014.12)

(58) Field of Classification Search
CPC . B64D 11/0641; B64D 11/0639; B64D 11/06; B64D 11/0649; B64D 11/0696; B64D 11/0627; B64D 11/0648; B64D 11/0646
See application file for complete search history.

(56) References Cited

U.S. PATENT DOCUMENTS

| | | | |
|---|---|---|---|
| 2,815,794 A * | 12/1957 | Hendrickson | B61D 33/0021 297/321 |
| 2,953,103 A * | 9/1960 | Bohannon | B61D 31/00 244/118.6 |
| 3,983,729 A | 10/1976 | Traczyk et al. | |
| 6,663,173 B1 | 12/2003 | Corfitsen | |
| 6,715,716 B1 | 4/2004 | Cheung | |

(Continued)

FOREIGN PATENT DOCUMENTS

| | | |
|---|---|---|
| EP | 3118116 A1 | 1/2017 |
| WO | 2019070194 A1 | 4/2019 |

OTHER PUBLICATIONS

European Patent Office, Extended European Search Report received in EP Application No. 24193448.8, Sep. 27, 2024, 6 pages.

*Primary Examiner* — Valentina Xavier
(74) *Attorney, Agent, or Firm* — Suiter Swantz IP

(57) ABSTRACT

A row of passenger seats convertible to a bed. The row includes a frame assembly supporting a plurality of laterally adjacent passenger seats. In embodiments, each seat includes a backrest having a first portion and a second portion movable relative to the first portion, a seat pan movable between a first position for seating and a second position for sleeping, and at least one link connecting the second portion of the backrest to the seat pan such that the second portion of the backrest tracks with the seat pan. In use, the second portion of the backrest resides in a plane of the backrest when the seat pan is in the first position, and resides in a plane of the seat pan when the seat pan is in the second position. In embodiments, the row provides a provision for sleeping in an economy class cabin of an airliner when occupancy permits seat row conversion.

18 Claims, 8 Drawing Sheets

(56) References Cited

U.S. PATENT DOCUMENTS

| | | | |
|---|---|---|---|
| 9,650,145 B2 | 5/2017 | Lambert | |
| 10,343,780 B2 * | 7/2019 | Portoles | B64D 11/0649 |
| 10,688,890 B2 * | 6/2020 | Mallette | B60N 2/34 |
| 10,696,409 B2 | 6/2020 | Lee | |
| 10,787,262 B2 | 9/2020 | Ward | |
| 11,046,436 B2 | 6/2021 | Carlioz et al. | |
| 2019/0308732 A1 | 10/2019 | Croudace | |

* cited by examiner

ROW OF PASSENGER SEATS CONVERTIBLE TO A BED

RELATED APPLICATION AND INCORPORATION BY REFERENCE

This nonprovisional application claims the benefit of priority of India application No. 202341053129 filed Aug. 8, 2023, which is hereby incorporated by reference in its entirety.

TECHNICAL FIELD AND BACKGROUND

The present disclosure relates generally to provisions for sleeping in a passenger cabin such as an economy class cabin, and more particularly, to a row of passenger seats convertible to a bed.

Passenger cabins in airliners and other conveyances typically include separate economy and premium seating classes. Premium seating classes, where comfort is paramount, may include highly adjustable passenger seats configured to transition from an upright sitting position to a bed through various intermediate sitting positions. Economy seating classes, where density is paramount, may include integrated seat rows with limited backrest recline.

Most passengers are not able to assume a comfortable sleeping position in an economy class seat considering the steep angle of a reclined backrest, fixed position of the seat pan, lack of a leg rest, and close proximity to other passengers. As such, passengers not able to afford the cost of a premium class seat are at a sleeping disadvantage, particularly on long haul flights.

Therefore, what is needed is a provision for sleeping in an economy class cabin.

BRIEF SUMMARY

In one aspect, embodiments of the inventive concepts disclosed herein are directed to a row of passenger seats convertible to a bed. In embodiments, seat row includes a frame assembly and at least two laterally adjacent passenger seats supported by the frame assembly. In embodiments, each passenger seat includes a backrest having a first portion and a second portion movable relative to the first portion, a seat pan movable between a first position for seating and a second position for sleeping, and at least one link connecting the second portion of the backrest to the seat pan such that the second portion of the backrest travels with the seat pan as the seat pan travels between the first and second positions. In use, when the seat pan is in the first position, the second portion of the backrest resides in a plane of the backrest, and when the seat pan is in the second position, the second portion of the backrest resides in a plane of the seat pan.

In embodiments, the first portion of the backrest is pivotally attached to the frame assembly, the first portion of the backrest forms middle and upper support portions of the backrest, the second portion of the backrest includes a first segment and a second segment rotatably coupled to the first segment, and the second portion of the backrest, when the seat pan is in the first position, forms a lower support portion of the backrest.

In embodiments, the seat row further includes guide tracks attached to the first portion of the backrest, and guides attached to the second portion of the backrest, the guides engaged in and configured to travel along the guide tracks as the second portion of the backrest travels with the seat pan.

In embodiments, each guide track includes a linear upper portion and a curved lower portion.

In embodiments, the seat row further includes guide tracks attached to the frame assembly, and guides attached to the seat pan, the guides engaged in and configured to travel along the guide tracks as the seat pan travels between the first position and the second position.

In embodiments, each guide is an elongated and linear.

In embodiments, the seat row further includes a projection extending laterally from each guide, and a removable strap configured to, when the seat pan is in the second position, extend from the projection to structure of a forward seat to support a forward end of the seat pan.

In embodiments, the seat row further includes a seat pan release mechanism including a lever positioned at a forward end of the seat pan, spring-loaded pins attached to the guide tracks and configured to engage with the guides, and cabling extending from the lever to each of the spring-loaded pins. In use, actuating the lever pulls the cabling to release the spring-loaded pins from engagement with the guides to allow the seat pan to move between the first and second positions.

In embodiments, the at least one link connecting the second portion of the backrest to the seat pan is curved.

In embodiments, the frame assembly includes an upwardly extending feature, the second portion of the backrest includes a downwardly extending feature, and the upwardly extending feature is configured to engage the downwardly extending feature, when the seat pan is in the second position, to support the second portion of the backrest from below.

In embodiments, the seat row further includes a diaphragm attached to the first portion of the backrest, wherein the diaphragm is exposed when the second portion of the backrest resides in the horizontal plane of the seat pan.

According to another aspect, the present disclosure provides a passenger seat row for an economy class aircraft cabin. The seat row includes a frame assembly and at least three laterally adjacent passenger seats supported by the frame assembly. In embodiments, each passenger seat includes a backrest including a first portion and a second portion movable relative to the first portion, a seat pan movable between a first position for seating and a second position for sleeping, and at least one link connecting the second portion of the backrest to the seat pan such that the second portion of the backrest travels with the seat pan as the seat pan travels between the first and second positions. In use, when the seat pan is in the first position, the second portion of the backrest resides in a plane of the backrest, and when the seat pan is in the second position, the second portion of the backrest resides in a plane of the seat pan.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
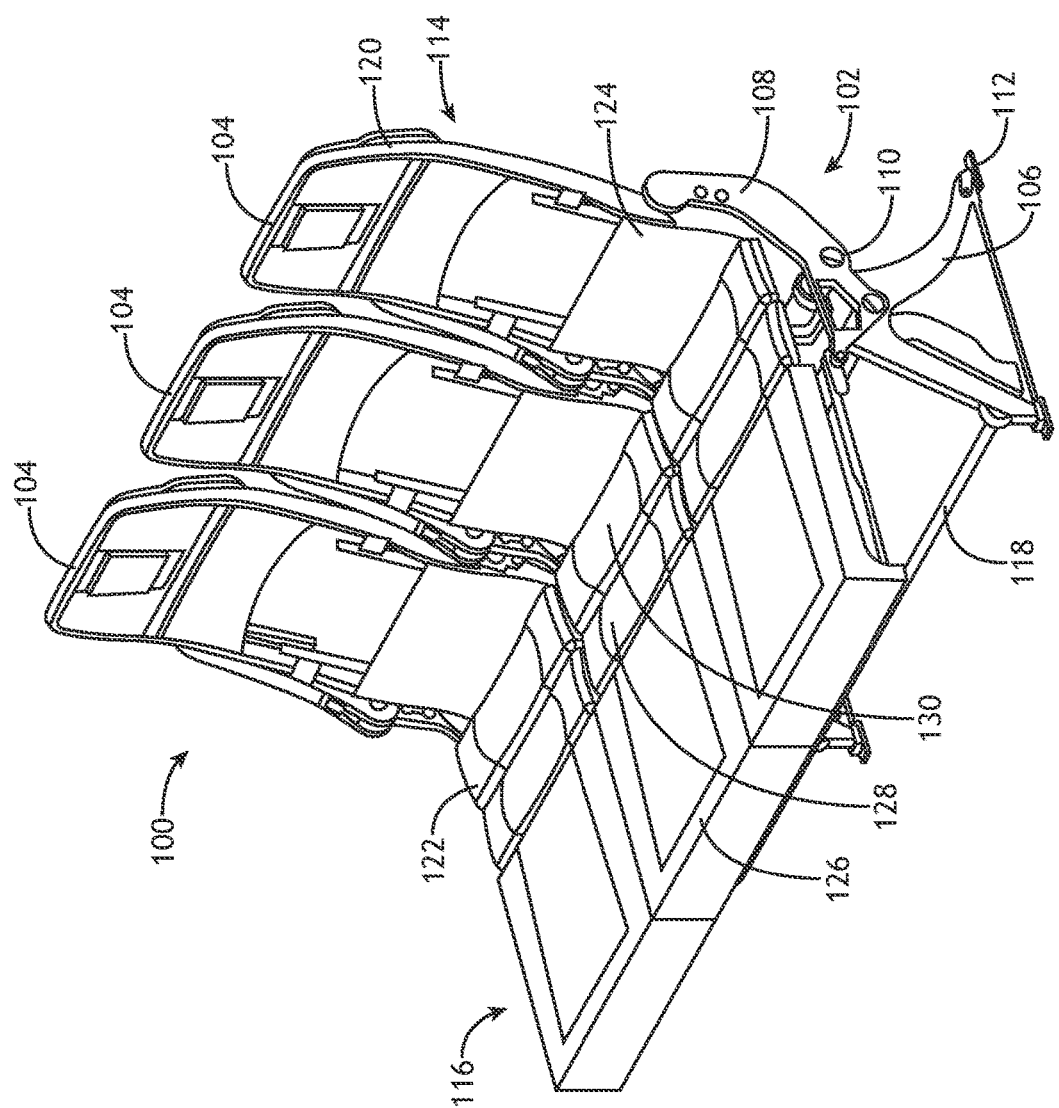
FIG. 1 is a front perspective view of a passenger seat row shown converted to a bed, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a row of passenger seats convertible to a bed. In embodiments, the seat row is an integrated assembly including a plurality of laterally adjacent seats, for instance 2, 3, 4 . . . n number of seats. When configured as passenger seats, the seat row has the appearance of any other seat row to provide a uniform look throughout the cabin. When configured as a bed, the seat pan and a portion of the backrest track together to form a flat bed substantially occupying the space between the backrest and a forward structure, for instance a forward row of seats. The row of seats may be converted to a bed, by independently converting each seat within the row, when occupancy within the cabin permits the conversion.

In use, when the passenger cabin is full and all or nearly all seats are sold, the seat row may be configured as passenger seats. When a number of seats in the passenger cabin are not sold, passenger assignments may be shuffled to make the seat row available to a single passenger for purchase at a premium, and that passenger purchasing the seat row has the option to convert the seat row to a bed during flight. In some embodiments, several seat rows according to the present disclosure may be strategically positioned within the cabin to provide the ability to convert at least some of the seat rows to beds during flight. The convertible seat rows may be positioned at the front or rear of the cabin for more privacy for sleeping.

FIG. 1 illustrates a row of passenger seats 100 according to the present disclosure shown converted to a bed. The row of passenger seats 100, also referred to herein as row 100, generally includes a frame assembly 102 supporting a number of laterally adjacent passenger seats 104, for instance two, three or four laterally adjacent passenger seats 104. As shown, the row 100 includes three laterally adjacent seats 104 commonly found in economy class seat rows and adequate to form a comfortable bed length for a sleeping passenger. Each seat 104 within the seat row 100 is independently convertible.

In embodiments, the frame assembly 102 includes legs 106, spreaders 108, and transverse beams 110. Track fasteners 112 may be used to secure the legs 106 to seat tracks embedded in the floor. As shown, the frame assembly 102 includes spaced transverse beams 110 in the form of tubes wherein each transverse beam 110 is received through the legs 106 and the spreaders 108. In embodiments, the spreaders 108 support rotational attachment of the backrest 114 and the transverse beams 110 support the sliding attachment of the seat pan 116. Although not shown, the spreaders 108 may further support rotational attachment of armrests. In embodiments, spreaders 108 may be positioned between adjacent seats 104 and at each end of the row 100. In embodiments, the frame assembly 102 may further include a luggage retention bar 118.

For each seat 104, the seat pan 116 is configured to move, for example translate horizontally, between a first position for sitting and a second position for sleeping. In FIG. 1, each seat pan 116 is shown in its respective second position with all three seat pans 116 transitioned and aligned to form a substantially continuous and flat bed. In some embodiments, each seat pan 116 tracks substantially horizontally between its respective first and second positions. Each backrest 114 generally includes a first portion 120 and a second portion 122 movable relative to the first portion. The first portion 120 forms the lateral sides, middle support, and upper support portion of the backrest. The second portion 122 forms the lower support portion of the backrest when the seats 104 are configured for sitting, and a portion of the bed when the seat pan 116 is in the second position. In embodiments, each seat 104 further includes a closeout 124 for the lower portion of the backrest 114 when the second portion 122 of the backrest 114 is moved to the plane of the seat pan 104. In embodiments, the closeout 124 may be in the form of a fabric diaphragm concealed from view when the second portion 122 is in the sitting position and revealed when the second portion 122 is in the bed position. In embodiments, each seat pan 116 includes at least one cushion 126, and the second portion 122 of the backrest 114 includes two coupled segments including two respective cushions 128, 130.

Figure 2:
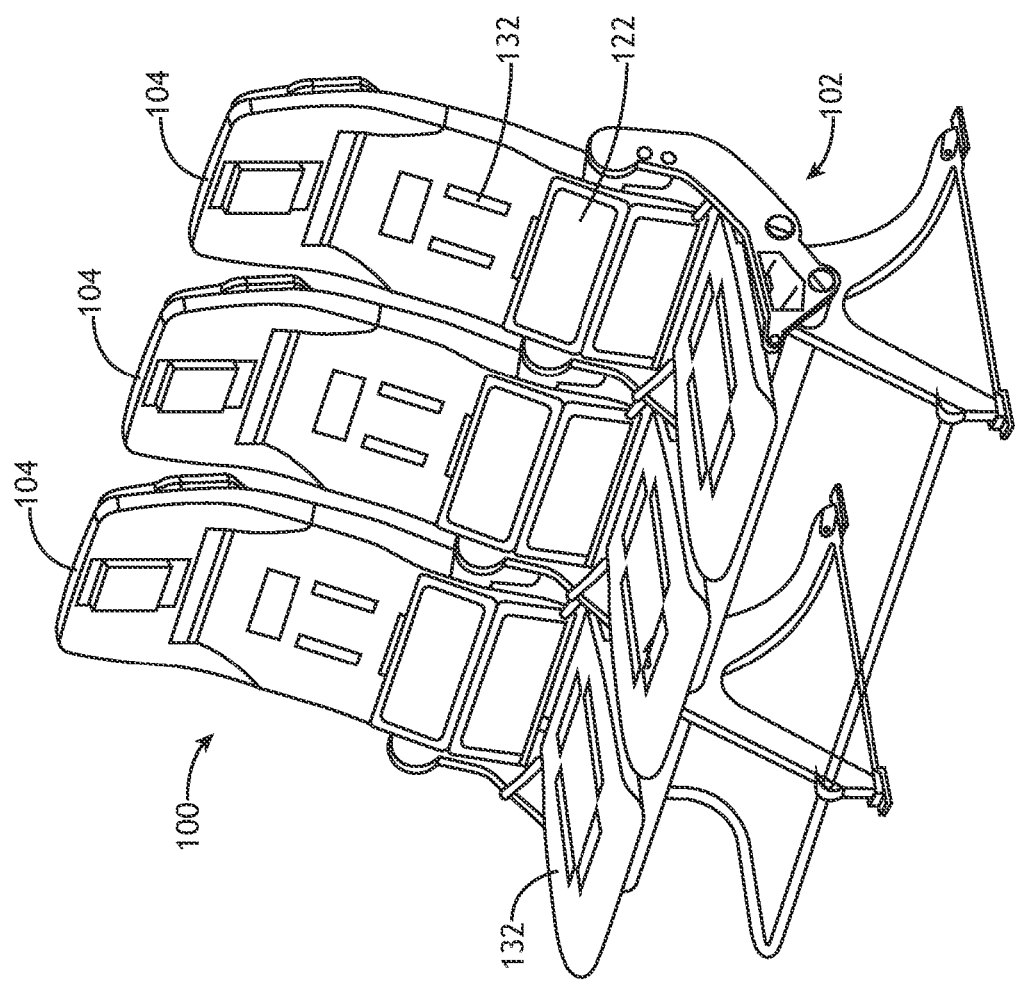
FIG. 2 is a front perspective view of the passenger seat row of FIG. 1 shown prior to conversion to a bed, in accordance with example embodiments of this disclosure.

FIG. 2 illustrates the row 100 according to the present disclosure shown converted to passenger seats 104. In embodiments, each of the seat pan and backrest portions may include touch fasteners 132 (e.g., Velcro strips) for releasably engaging with corresponding touch fasteners positioned on the underside of the cushions for removable attachment of the cushions. When in the seat configuration shown in FIG. 2, the second portion 122 of each backrest 114 forms the lower support portion of the backrest, for instance providing lower back comfort and support.

Figure 3:
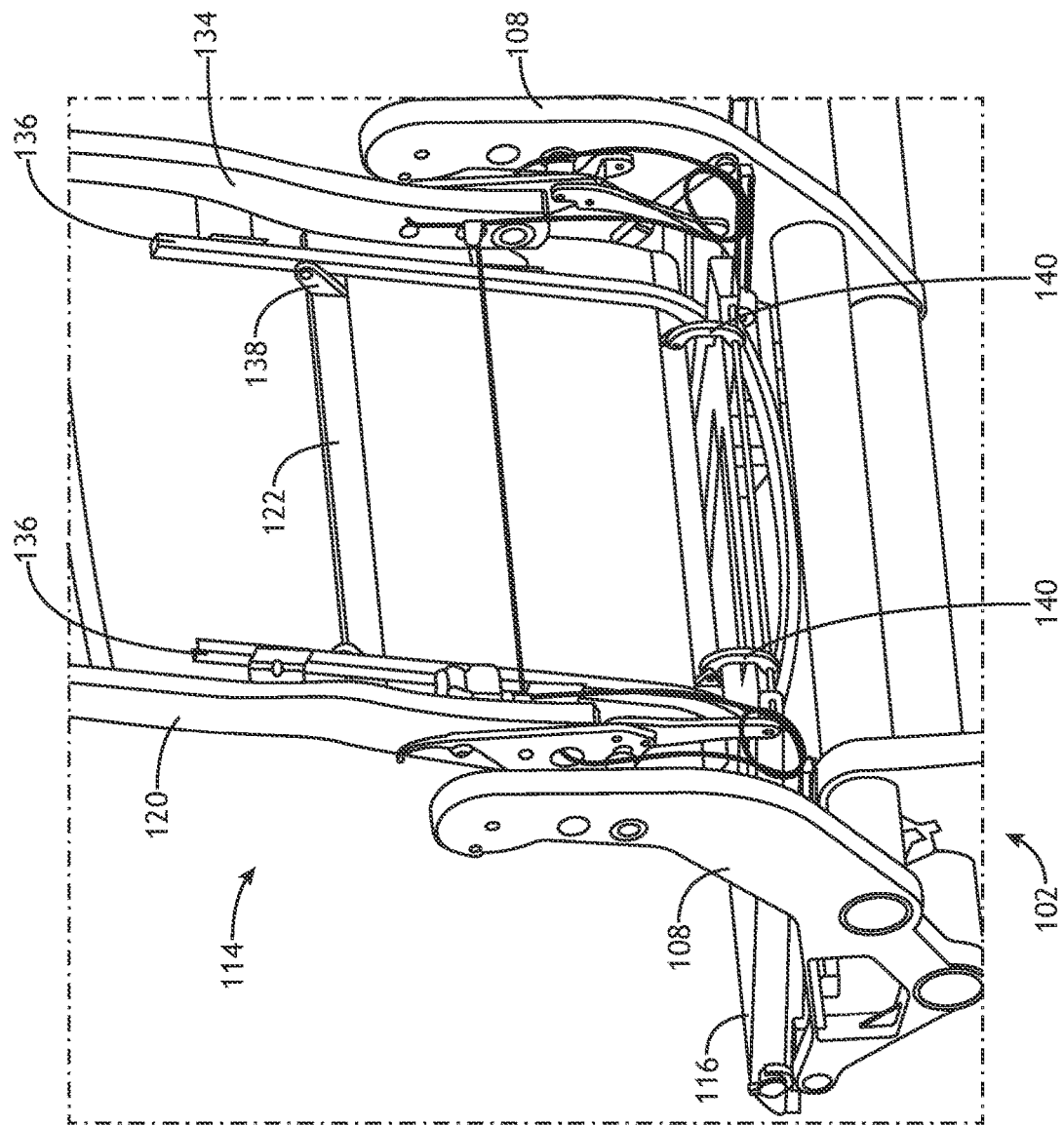
FIG. 3 is a rear perspective view of the backrest of one of the passenger seats of the passenger seat row, in accordance with example embodiments of this disclosure.

FIG. 3 illustrates a particular configuration of the backrest 114. The first portion 120 of the backrest 114 is pivotally attached to the frame assembly 102, for instance rotatably attached between spaced spreaders 108. In use, the first portion 120 of the backrest 114 pivots about a rotation axis between upright and reclined sitting positions. When positioned in the sitting position, the second portion 122 of the backrest 114 rotates with the first portion 120 of the backrest 114 between the upright and reclined states of the backrest 114. In embodiments, the fully upright state of the backrest 114 may correspond to a taxi, takeoff, and landing (TTOL) state of the backrest 114, and the reclined state of the backrest 114 corresponds to a more comfortable sitting position during flight. In some embodiments, the recline feature of the backrest 114 and the bed conversion feature of the row 100 are mutually inclusive features. In other embodiments, the recline feature of the backrest 114 and the bed conversion feature of the row 100 may be made to be mutually exclusive features.

In embodiments, the first portion 120 of the backrest 114 includes a rigid U-shaped frame member 134 or coupled members forming a like or similar shape. Within the frame member 134 are positioned first and second guide tracks 136 attached to the first portion 120 in a symmetrical arrangement. In embodiments, each guide track 136 defines a motion pathway for the second portion 122 of the backrest 114. In some embodiments, the guide tracks 136 include a linear upper portion and a curved lower portion such that the motion path transitions from linear to curved to facilitate rotation between a substantially vertical orientation and a substantially horizontal orientation for the second portion 122 of the backrest 114.

In embodiments, the second portion 122 of the backrest 114 carries guides 138 in a symmetrical arrangement, wherein the guides 138 are configured to travel within or along the guide tracks 136. In a non-limiting example, the guide tracks 136 may be roller tracks and the guides 138 may be vertically oriented rollers configured to roll along to guide tracks 136 to facilitate smooth motion. The bottom end of the second portion 122 of the backrest may be rotatably coupled to the back or aft end of the seat pan 116 such that the second portion 122 rotates toward horizontal as the seat pan 116 tracks forward pulling the second portion 122 therewith, and rotates toward vertical as the seat pan 116 tracks aft pushing the second portion 122. In embodiments, the second portion 122 of the backrest 114 and the seat pan 116 are rotatably coupled by a symmetrical arrangement of curved links 140 configured to space apart, allow rotation, and define the positional relationship between the second portion 122 and the seat pan 116.

Figure 4:
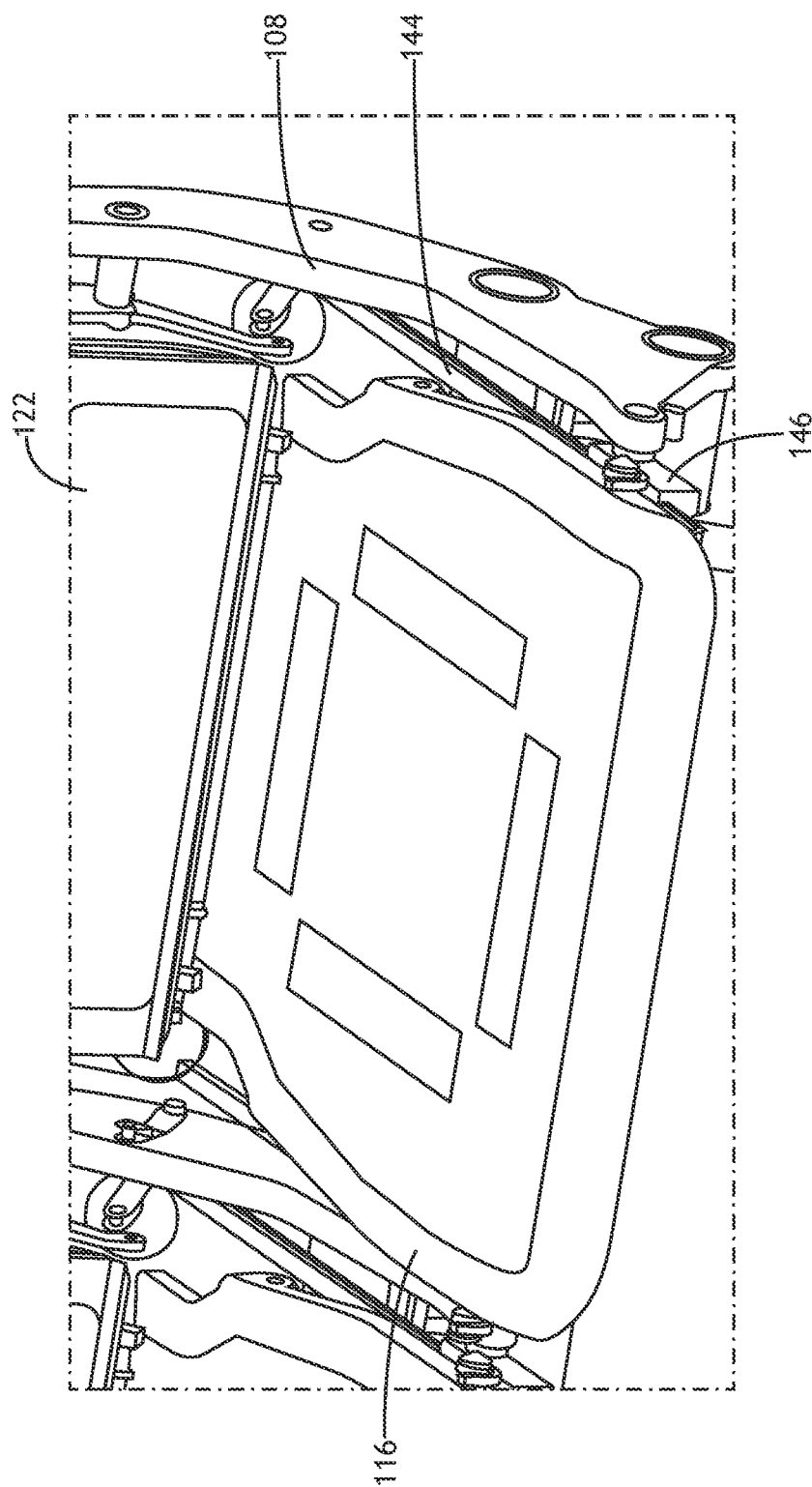
FIG. 4 is a top perspective view of the seat pan of one of the passenger seats of the passenger seat row, in accordance with example embodiments of this disclosure.

FIG. 4 illustrates a particular configuration of the seat pan 116. As discussed above, the aft end of the seat pan 116 is coupled to the second portion 122 of the backrest 114. In embodiments, the lateral sides of the seat pan 116 are attached to elongated linear guides 144 engaged in and configured to travel along guide tracks 146 attached to or otherwise integrated into the frame assembly 102, for instance attached directly to the spreaders 108 as shown. The guides 144 and the guide tracks 146 may be provided in a symmetrical arrangement on both sides of the seat pan 116 to facilitate smooth motion and square tracking of the seat pan 116 between its respective first position for seating and second position for sleeping. In some embodiments, the guide tracks 146 may include vertically oriented rollers engaging the guides 144. Mechanical stops may be positioned at one or more ends of the guides configured to interact with the guide tracks 146 to limit forward and/or aft travel of the seat pan 116.

Figure 5:
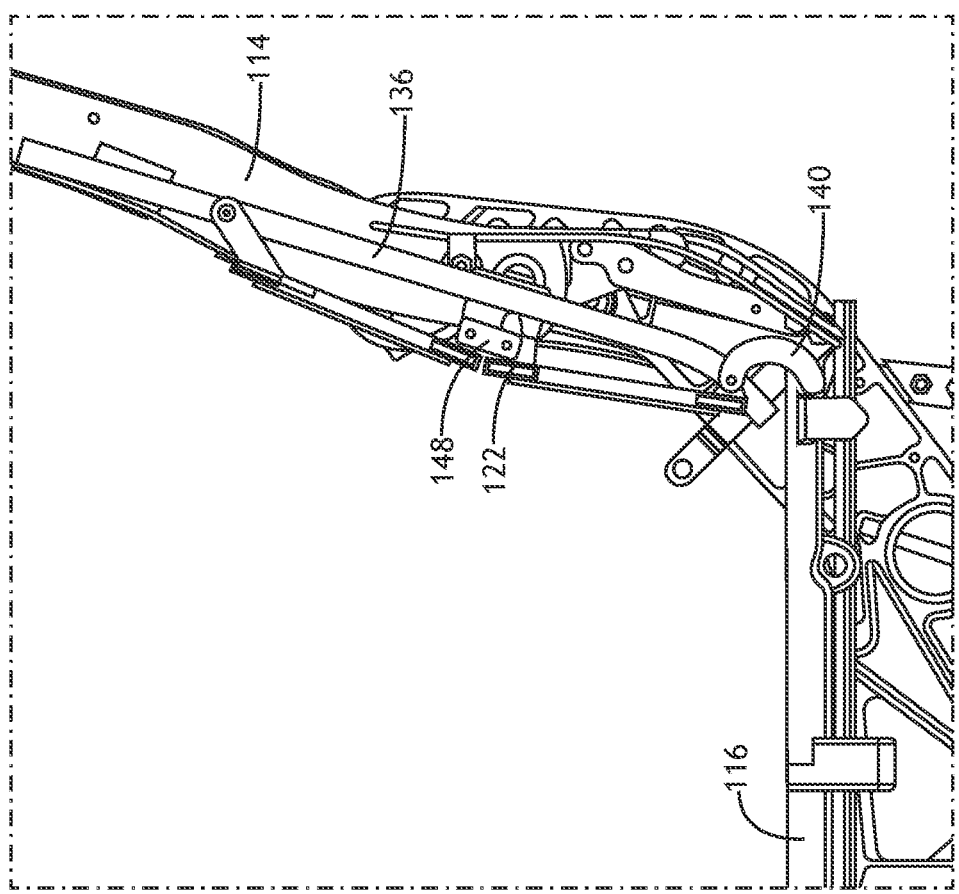
FIG. 5 is a side elevation view of the passenger seat row showing the coupling of the seat pan and backrest, in accordance with example embodiments of this disclosure.

FIG. 5 illustrates a coupling of the seat pan 116 to the second portion 122 of the backrest 114, as well as a coupling of the two individual segments of the second portion 122 of the backrest 114. In embodiments, the curved coupling links 140 allow a particular positional relationship of the seat pan 116 to the bottom end of the second portion 122 of the backrest 114 when in the second position of the seat pan 116. As shown, the curved links 140 allow the bottom end of the second portion 122 of the backrest 114 to be positioned spaced apart above the back end of the seat pan 116 when in the first position of the seat pan 116. When the seat pan 116 is in the first position as shown for sitting, the second portion 122 of the backrest 114 is oriented in the plane of the backrest 114.

As shown, connecting links 148 coupling the upper and lower segments of the second portion 122 of the backrest 114 allow an angle to be formed between the two segments, for instance allowing the second portion 122 to form an ergonomic convex curvature to support the lower back. In embodiments, the connecting links 148 may be provided in a symmetrical arrangement on both lateral sides of the second portion 122 of the backrest 114. In embodiments, the curvature of the guide tracks 136 allows the bottom end of the second portion 122 of the backrest 114 to be positioned farther forward as compared to the top end, thereby orienting the second portion 122 of the backrest 114 inclined for support and comfort. The height of the second portion 122 of the backrest 114 may be customized, for example depending on the length of the seat pan 116 and the seat pitch, to achieve a desired bed width.

Figure 6B:
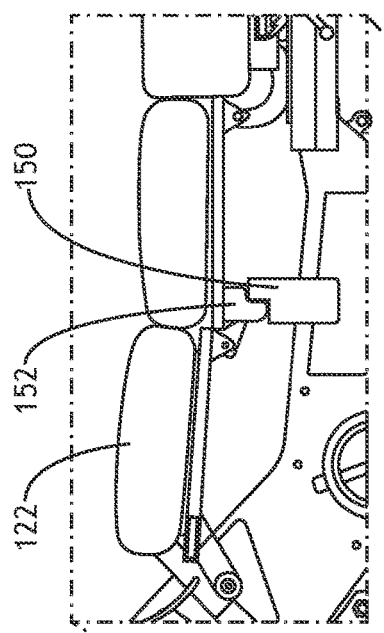
FIG. 6B is a detailed view of FIG. 6A showing the interface between the second portion of the backrest and the frame assembly, in accordance with example embodiments of this disclosure.
Figure 6A:
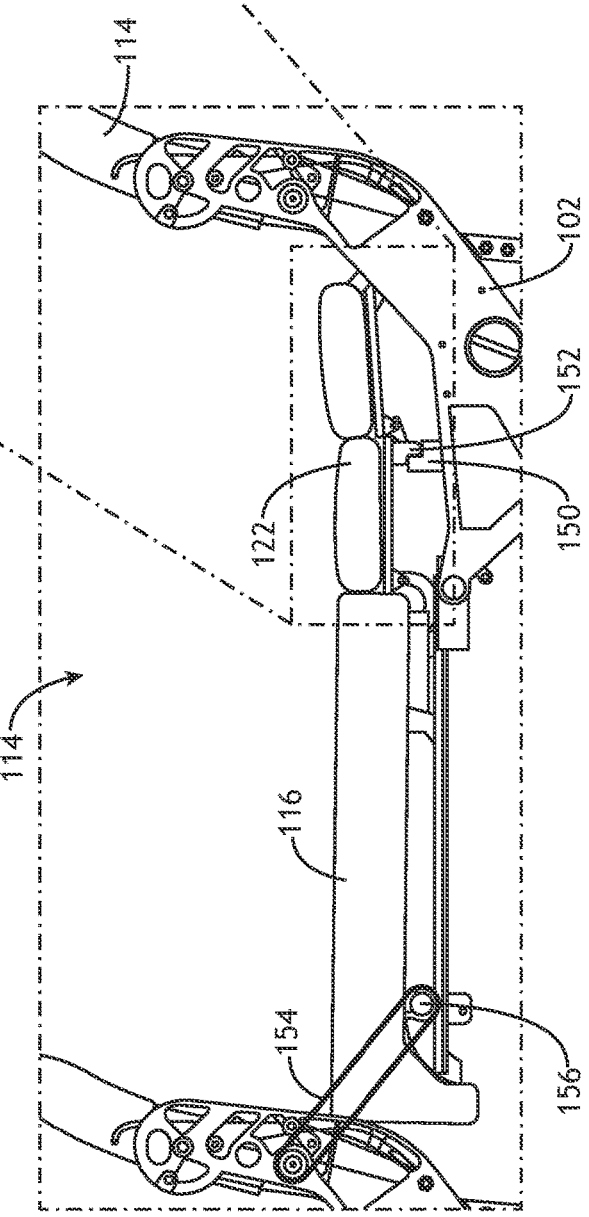
FIG. 6A is a side elevation view of the passenger seat row showing the seat pan and backrest in a second position corresponding to a bed, in accordance with example embodiments of this disclosure.

FIGS. 6A and 6B illustrate a passenger seat 104 converted to form the bed. When the seat pan 116 is tracked to the second position, the second portion 122 of the backrest 114 is pulled along therewith to a position residing in the plane of the seat pan 116, substantially horizontal and adjacent to the seat pan 116 to form a substantially continuous flat bed. The separate segments of the second portion 122 are aligned substantially coplanar to fill the space between the aft end of the seat pan 116 and the front of the backrest 114.

In embodiments, the frame assembly 102 includes an upwardly extending feature 150 configured to interact with a corresponding downwardly extending feature 152 positioned on the backside of the second portion 122 of the backrest 114. In some embodiments, the features 150, 152 are complimentary shaped to interact to maintain engagement. As shown, the upwardly extending feature 150 is shaped to include a ledge and the upwardly extending feature 150 is shaped to include an overhang configured to engage atop the ledge. In use, the engaged features 150, 152 support the load on the second portion 122 from below, maintain planarity of the segments of the second portion, and prevent continued forward movement of the second portion 122.

When the seat pan 116 is translated fully forward, straps 154, for instance provided in a symmetrical arrangement on the later sides of the seat pan 116, may be used to help carry the load of the cantilevered seat pan 116. In embodiments, the seat pan 116 may include laterally extending features 156, for instance an elongated bar extending through the width of the seat pan 116 wherein each end of the bar extends outward from one lateral side. In use, each removable strap 154 may secure around one end of the bar 156 and to a forward structure, for instance a structure of a forward seat row or a fixed structure positioned forward of the seat row. In embodiments, each strap 154 may include a length of strap threaded through an adjustable strap buckle.

Figure 7:
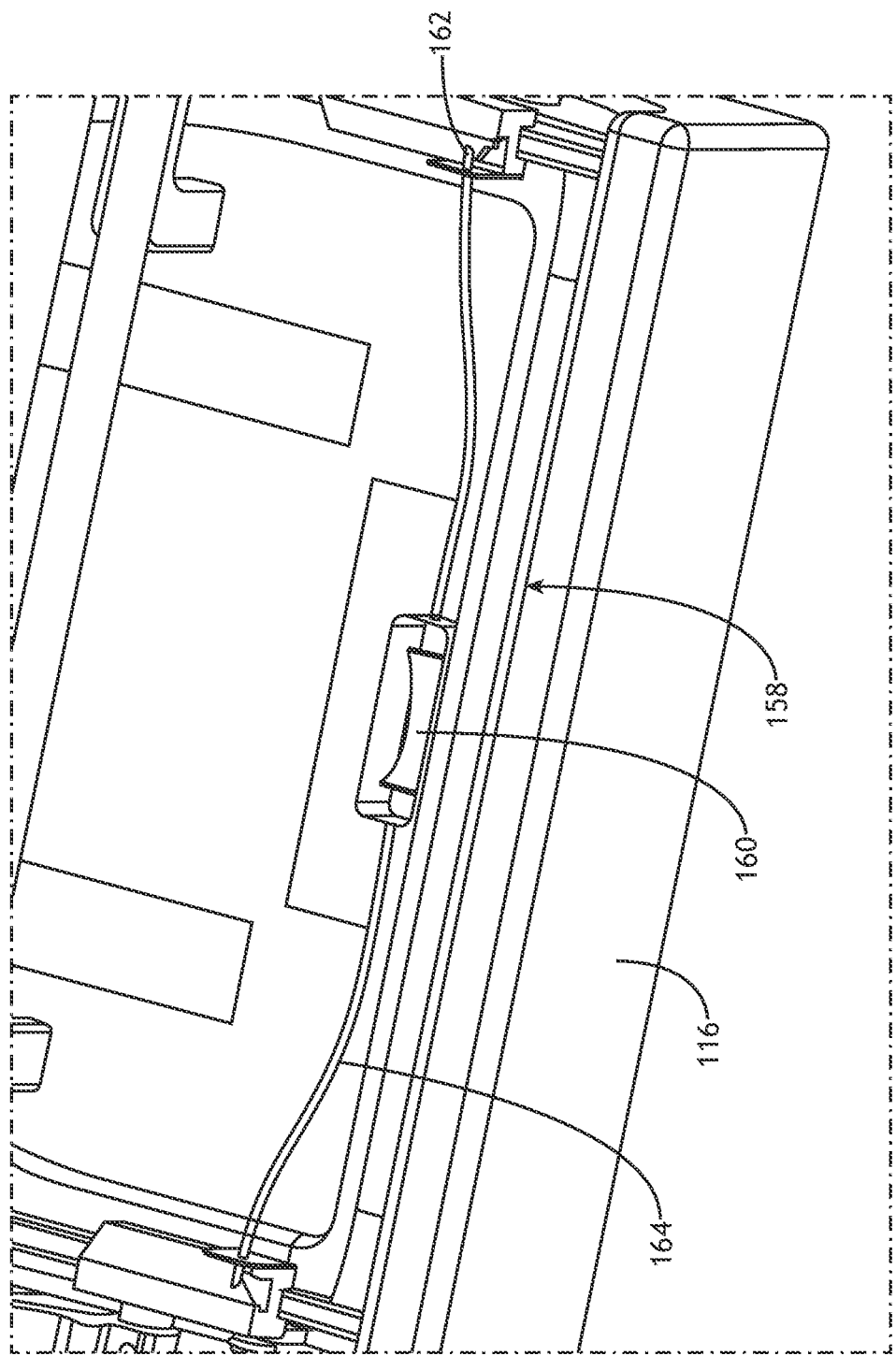
FIG. 7 is a bottom perspective view of the seat pan showing a release mechanism for the seat pan, in accordance with example embodiments of this disclosure.

FIG. 7 illustrates a release mechanism 158 associated with the seat pan 116. In some embodiments, the release mechanism 158 includes an actuator 160, for instance a handle, lever, release button, etc., located under the forward end of the seat pan 116 for convenient access. The actuator 160 is interconnected to release pins 162 through cables 164 extending from the actuator 160 to the lateral sides of the seat pan 116. In embodiments, the cables 164 may be Bowden style cables including a wire configured to translate within a cable jacket. The release pins 162 may be spring-loaded and received within openings formed in the seat pan guides 144. In use, operating the actuator 160 causes the wire to be pulled thereby releasing the spring-loaded release pins 162 form engagement in their respective openings, thereby allowing the seat pan 116 to be moved. In some embodiments, the guides 144 may define front and rear openings such that the seat pan 116 can be locked in place in the sitting or bed position.

Figure 8:
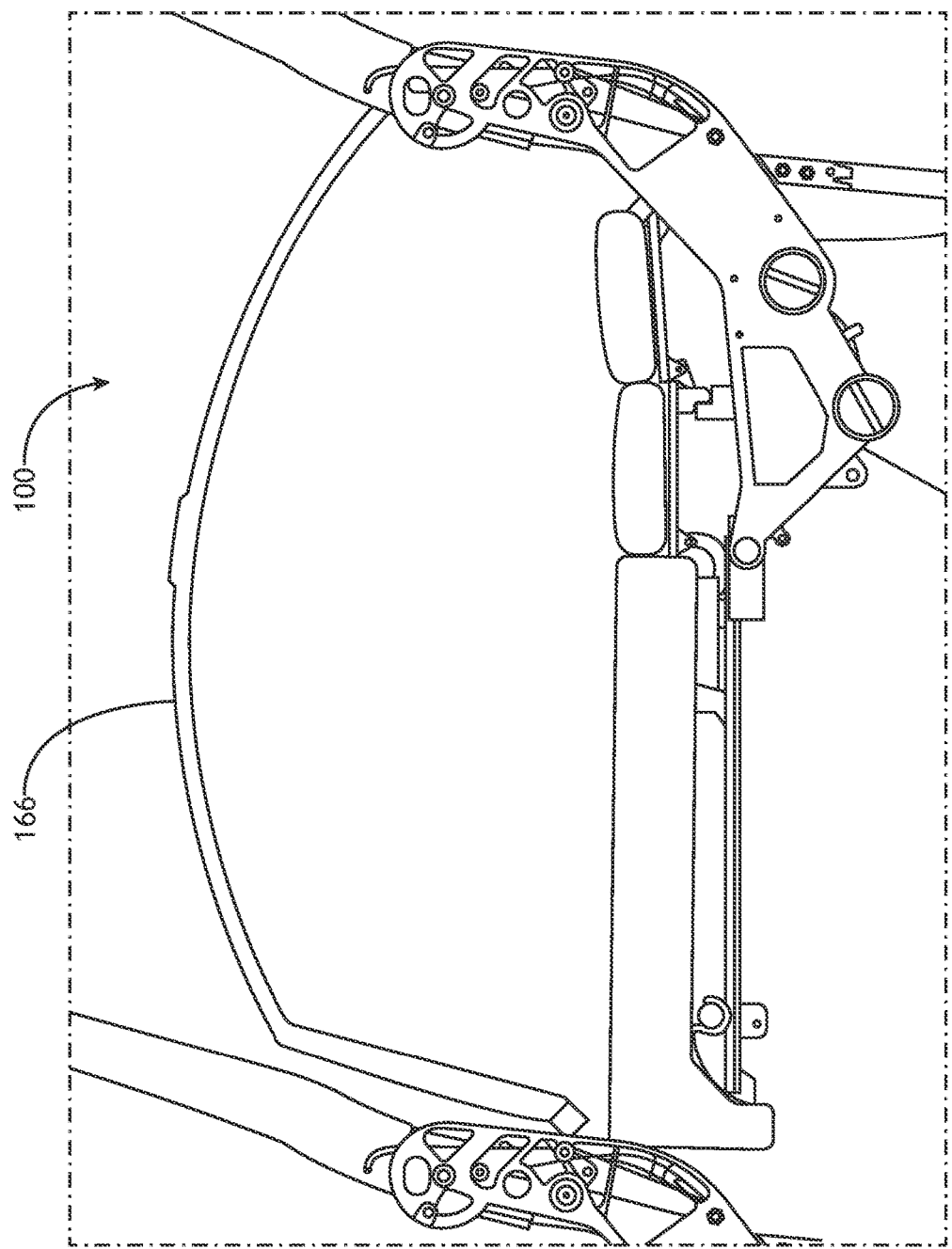
FIG. 8 is a side elevation view of the passenger seat row shown converted to a bed and a passenger restraint for use in bed mode, in accordance with example embodiments of this disclosure.

FIG. 8 illustrates the row 100 converted to form a bed and a passenger restraint 166 for use during bed mode. In embodiments, the passenger restraint 166 may utilize the middle seat restraint for positioning and add an extension configured to anchor to a forward seat row or other forward structure. In use, the restrain extends across the width of the formed bed and secures around the sleeping passenger about the waist.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A row of passenger seats convertible to a bed, comprising:
   a frame assembly; and
   at least two laterally adjacent passenger seats supported by the frame assembly, each passenger seat comprising:
      a backrest including a first portion and a second portion movable relative to the first portion;
      a seat pan movable between a first position for seating and a second position for sleeping; and
      at least one link connecting the second portion of the backrest to the seat pan such that the second portion of the backrest travels with the seat pan as the seat pan travels between the first and second positions;
      wherein, when the seat pan is in the first position, the second portion of the backrest resides in a plane of the backrest;
      wherein, when the seat pan is in the second position, the second portion of the backrest resides in a plane of the seat pan; and
      wherein:
         the first portion of the backrest is pivotally attached to the frame assembly;
         the first portion of the backrest forms middle and upper support portions of the backrest;
         the second portion of the backrest includes a first segment and a second segment rotatably coupled to the first segment; and
         the second portion of the backrest, when the seat pan is in the first position, forms a lower support portion of the backrest.

2. The row of passenger seats according to claim 1, further comprising:
   guide tracks attached to the first portion of the backrest; and
   guides attached to the second portion of the backrest, the guides engaged in and configured to travel along the guide tracks as the second portion of the backrest travels with the seat pan.

3. The row of passenger seats according to claim 2, wherein each guide track includes a linear upper portion and a curved lower portion.

4. The row of passenger seats according to claim 1, further comprising:
   guide tracks attached to the frame assembly; and guides attached to the seat pan, the guides engaged in and configured to travel along the guide tracks as the seat pan travels between the first position and the second position.

5. The row of passenger seats according to claim 4, wherein each guide is elongated and linear.

6. The row of passenger seats according to claim 4, further comprising:
   a projection extending laterally from each guide; and
   a removable strap configured to, when the seat pan is in the second position, extend from the projection to structure of a forward seat to support a forward end of the seat pan.

7. The row of passenger seats according to claim 4, further comprising a seat pan release mechanism comprising:
   a lever positioned at a forward end of the seat pan;
   spring-loaded pins attached to the guide tracks and configured to engage with the guides; and
   cabling extending from the lever to each of the spring-loaded pins;
   wherein actuating the lever pulls the cabling to release the spring-loaded pins from engagement with the guides to allow the seat pan to move between the first and second positions.

8. The row of passenger seats according to claim 1, wherein the at least one link connecting the second portion of the backrest to the seat pan is curved.

9. The row of passenger seats according to claim 1, wherein:
   the frame assembly comprises an upwardly extending feature;
   the second portion of the backrest comprises a downwardly extending feature; and
   the upwardly extending feature is configured to engage the downwardly extending feature, when the seat pan is in the second position, to support the second portion of the backrest from below.

10. The row of passenger seats according to claim 1, further comprising a diaphragm attached to the first portion of the backrest, wherein the diaphragm is exposed when the second portion of the backrest resides in the horizontal plane of the seat pan.

11. A passenger seat row for an economy class aircraft cabin, comprising:
    a frame assembly; and
    at least three laterally adjacent passenger seats supported by the frame assembly, each passenger seat comprising:
      a backrest including a first portion and a second portion movable relative to the first portion;
      a seat pan movable between a first position for seating and a second position for sleeping; and
      at least one link connecting the second portion of the backrest to the seat pan such that the second portion of the backrest travels with the seat pan as the seat pan travels between the first and second positions;
    wherein, when the seat pan is in the first position, the second portion of the backrest resides in a plane of the backrest;
    wherein, when the seat pan is in the second position, the second portion of the backrest resides in a plane of the seat pan; and
    wherein the frame assembly comprises an upwardly extending feature, the second portion of the backrest comprises a downwardly extending feature, and the upwardly extending feature is configured to engage the downwardly extending feature, when the seat pan is in the second position, to support the second portion of the backrest from below.

12. The passenger seat row according to claim 11, wherein:
    the first portion of the backrest is pivotally attached to the frame assembly;
    the first portion of the backrest forms middle and upper support portions of the backrest;
    the second portion of the backrest includes a first segment and a second segment rotatably coupled to the first segment; and
    the second portion of the backrest, when the seat pan is in the first position, forms a lower support portion of the backrest.

13. The passenger seat row according to claim 11, wherein the frame assembly comprises:
    spreaders;
    legs; and
    transverse beams attached to the spreaders and the legs.

14. The passenger seat row according to claim 11, further comprising:
    guide tracks attached to the first portion of the backrest, each guide track including a linear upper portion and a curved lower portion; and
    guides attached to the second portion of the backrest, the guides engaged in and configured to travel along the guide tracks as the second portion of the backrest travels with the seat pan.

15. The passenger seat row according to claim 11, further comprising:
    guide tracks attached to the frame assembly; and
    guides attached to the seat pan, the guides engaged in and configured to travel along the guide tracks as the seat pan travels between the first position and the second position.

16. The passenger seat row according to claim 15, further comprising:
    a projection extending laterally from each guide; and
    a removable strap configured to, when the seat pan is in the second position, extend from the projection to structure of a forward seat to support a forward end of the seat pan.

17. The passenger seat row according to claim 15, further comprising a seat pan release mechanism comprising:
    a lever positioned at a forward end of the seat pan;
    spring-loaded pins attached to the guide tracks and configured to engage with the guides; and
    cabling extending from the lever to each of the spring-loaded pins;
    wherein actuating the lever pulls the cabling to release the spring-loaded pins from engagement with the guides to allow the seat pan to move between the first and second positions.

18. The passenger seat row according to claim 11, wherein the at least one link connecting the second portion of the backrest to the seat pan is curved.

* * * * *